United States Patent
Niwata et al.

(10) Patent No.: US 10,801,596 B2
(45) Date of Patent: Oct. 13, 2020

(54) POWER TRANSMISSION DEVICE

(71) Applicant: HONDA MOTOR CO., LTD., Tokyo (JP)

(72) Inventors: Kenji Niwata, Wako (JP); Nobutaka Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 15/838,183

(22) Filed: Dec. 11, 2017

(65) Prior Publication Data
US 2018/0163839 A1 Jun. 14, 2018

(30) Foreign Application Priority Data

Dec. 14, 2016 (JP) .................................. 2016-242742
Feb. 9, 2017 (JP) .................................. 2017-022499

(51) Int. Cl.
*F16H 48/19* (2012.01)
*F16H 57/021* (2012.01)
(Continued)

(52) U.S. Cl.
CPC ........... *F16H 48/19* (2013.01); *F16H 57/021* (2013.01); *F16H 57/038* (2013.01);
(Continued)

(58) Field of Classification Search
CPC ...... F16H 48/19; F16H 57/021; F16H 57/038; F16H 57/0471
See application file for complete search history.

(56) References Cited

U.S. PATENT DOCUMENTS 3,732,750 A * 5/1973 Posh ....................... F16D 41/10
74/650
2003/0024787 A1* 2/2003 Osborn ................... F16H 48/22
192/48.2
(Continued)

FOREIGN PATENT DOCUMENTS

CN 108026982 5/2018
JP 2014-185767 10/2014
(Continued)

OTHER PUBLICATIONS

Japanese Office Action for corresponding JP Application No. 2017-022499, dated Jun. 19, 2018 (w/ English machine translation).
(Continued)

*Primary Examiner* — Terence Boes
(74) *Attorney, Agent, or Firm* — Mori & Ward, LLP (57) ABSTRACT

A power transmission device includes first and second engaging elements, a power transmission, and first and second bearings. The first engaging element is rotatable with a first rotation shaft about a rotation axis. The second engaging element is rotatable with a second rotation shaft about the rotation axis. The power transmission is provided between the first engaging element and the second engaging element. The first bearing is provided between the rotation axis and the second engaging element in a radial direction with respect to the rotation axis and supports a first part of the second engaging element. The second engaging element is between the second bearing and the rotation axis in the radial direction. The second bearing supports a second part of the second engaging element. The second part is farther from the first engaging element in an axis direction than the first part.

24 Claims, 7 Drawing Sheets

(51) Int. Cl.
   *F16H 57/038* (2012.01)
   *F16H 57/04* (2010.01)
   *F16C 33/66* (2006.01)
   *F16C 19/06* (2006.01)
   *F16C 19/36* (2006.01)

(52) U.S. Cl.
   CPC .......... *F16H 57/0471* (2013.01); *F16C 19/06* (2013.01); *F16C 19/364* (2013.01); *F16C 33/6659* (2013.01); *F16C 2361/61* (2013.01); *F16H 57/0473* (2013.01)

(56) References Cited

U.S. PATENT DOCUMENTS

| | | | | |
|---|---|---|---|---|
| 2014/0284168 | A1* | 9/2014 | Niwata | F16D 25/083 192/85.61 |
| 2018/0209489 | A1* | 7/2018 | Yamaguchi | F16D 25/08 |
| 2018/0238399 | A1* | 8/2018 | Yamaguchi | F16H 57/0473 |
| 2018/0245642 | A1* | 8/2018 | Niwata | F16D 25/14 |
| 2018/0259006 | A1* | 9/2018 | Yamaguchi | F16D 25/083 |
| 2018/0259007 | A1* | 9/2018 | Yamaguchi | F16D 25/14 |
| 2018/0335128 | A1* | 11/2018 | Yamaguchi | F16H 57/037 |
| 2019/0203824 | A1* | 7/2019 | Niwata | F16H 57/021 |
| 2019/0242443 | A1* | 8/2019 | Yamaguchi | F16D 25/0638 |

FOREIGN PATENT DOCUMENTS

| | | |
|---|---|---|
| JP | 2014-194242 | 10/2014 |
| JP | WO2015/146467 | 10/2015 |
| WO | WO2017/047475 | 3/2017 |

OTHER PUBLICATIONS

Chinese Office Action for corresponding CN Application No. 201711308336.4, dated Apr. 1, 2020 (w/ English machine translation).

* cited by examiner

POWER TRANSMISSION DEVICE

CROSS-REFERENCE TO RELATED APPLICATIONS

The present application claims priority under 35 U.S.C. § 119 to Japanese Patent Applications No. 2017-022499, filed Feb. 9, 2017, entitled "Power Transmission Device" and No. 2016-242742, filed Dec. 14, 2016, entitled "Power Transmission Device." The contents of these applications are incorporated herein by reference in their entirety.

BACKGROUND

1. Field

The present disclosure relates to a power transmission device.

2. Description of the Related Art

In an existing power transmission device in which both an input-side power transmission element and an output-side power transmission element are rotational elements, each of the power transmission elements is rotatably supported by a plurality of bearing members. For example, Japanese Unexamined Patent Application Publication Nos. 2014-194242 and 2014-185767 each describe a power transmission device in which one bearing member is disposed between a clutch housing and a clutch hub, which are an input-side power transmission element and an output-side power transmission element, respectively, and another bearing member is disposed between the clutch hub and a casing.

In general, each of such rotational elements, as power transmission elements, is supported by an inner ring and an outer ring, which are in contact with the clutch hub and with the clutch housing or the casing, respectively, of each bearing member, as disclosed in Japanese Unexamined Patent Application Publication Nos. 2014-194242 and 2014-185767.

The power transmission elements receive torque during clutch engagement. As a result, one of the power transmission elements (for example, the clutch hub) is subjected to a force causing the power transmission element to incline relative to a rotation shaft. When the degree of the inclination of the clutch hub relative to the rotation shaft is large, a portion of the clutch may slip and the inclination may cause a torque fluctuation and an abnormal noise.

SUMMARY

According to one aspect of the present invention, a power transmission device includes a first rotation shaft; a second rotation shaft that shares a common rotation axis with the first rotation shaft; a power transmission element including a first engaging element that rotates with the first rotation shaft and a second engaging element that rotates with the second rotation shaft, the power transmission element being capable of transmitting power from the first engaging element to the second engaging element; a casing that accommodates the power transmission element; a first bearing interposed between the first engaging element and the second engaging element; and a second bearing interposed between the second engaging element and the casing. The first engaging element includes a first extending portion that extends in a direction of the rotation axis. The second engaging element includes a second extending portion that extends in the direction of the rotation axis. The casing includes a third extending portion that extends in the direction of the rotation axis. The first bearing is disposed on an outer side of the first extending portion and on an inner side of the second extending portion. The second bearing is disposed on an outer side of the second extending portion and on an inner side of the third extending portion.

According to another aspect of the present invention, a power transmission device includes the first rotation shaft; the second rotation shaft that shares a common rotation axis with the first rotation shaft; the power transmission element including the first engaging element that rotates with the first rotation shaft and the second engaging element that rotates with the second rotation shaft, the power transmission element being capable of transmitting power from the first engaging element to the second engaging element; the first bearing that supports a part of the second engaging element, the part being adjacent to the first engaging element in a rotation-axis direction; and the second bearing that supports a part of the second engaging element, the part being away from the first engaging element in the rotation-axis direction. The first bearing is disposed on an inner side of the second engaging element. The second bearing is disposed on an outer side of the second engaging element.

According to a further aspect of the present invention, a power transmission device includes a first rotation shaft, a second rotation shaft, a first engaging element, a second engaging element, a power transmission, a casing, a first bearing, and a second bearing. The first rotation shaft is rotatable about a rotation axis extending in an axis direction. The second rotation shaft is rotatable about the rotation axis. The first engaging element is rotatable with the first rotation shaft about the rotation axis. The first engaging element includes a first extending portion extending in the axis direction. The second engaging element is rotatable with the second rotation shaft about the rotation axis. The second engaging element includes a second extending portion extending in the axis direction. The power transmission is provided between the first engaging element and the second engaging element to transmit power from the first engaging element to the second engaging element. The casing accommodates the power transmission and includes a third extending portion extending in the axis direction. The first bearing is provided between the first engaging element and the second engaging element in a radial direction with respect to the rotation axis. The first engaging element is provided between the rotation axis and the first bearing in the radial direction. The second bearing is provided between the second engaging element and the casing in the radial direction. The second engaging element is provided between the rotation axis and the second bearing in the radial direction.

According to a further aspect of the present invention, a power transmission device includes a first rotation shaft, a second rotation shaft, a first engaging element, a second engaging element, a power transmission, a first bearing, and a second bearing. The first rotation shaft rotatable about a rotation axis extending in an axis direction. The second rotation shaft is rotatable about the rotation axis. The first engaging element is rotatable with the first rotation shaft about the rotation axis. The second engaging element is rotatable with the second rotation shaft about the rotation axis. The power transmission is provided between the first engaging element and the second engaging element to transmit power from the first engaging element to the second engaging element. The first bearing is provided between the rotation axis and the second engaging element in a radial direction with respect to the rotation axis and supports a first part of the second engaging element. The second bearing is provided such that the second engaging element is between the second bearing and the rotation axis in the radial direction and supports a second part of the second engaging element. The second part is farther from the first engaging element in the axis direction than the first part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE PREFERRED EMBODIMENTS

The embodiments will now be described with reference to the accompanying drawings, wherein like reference numerals designate corresponding or identical elements throughout the various drawings.

Figure 1:
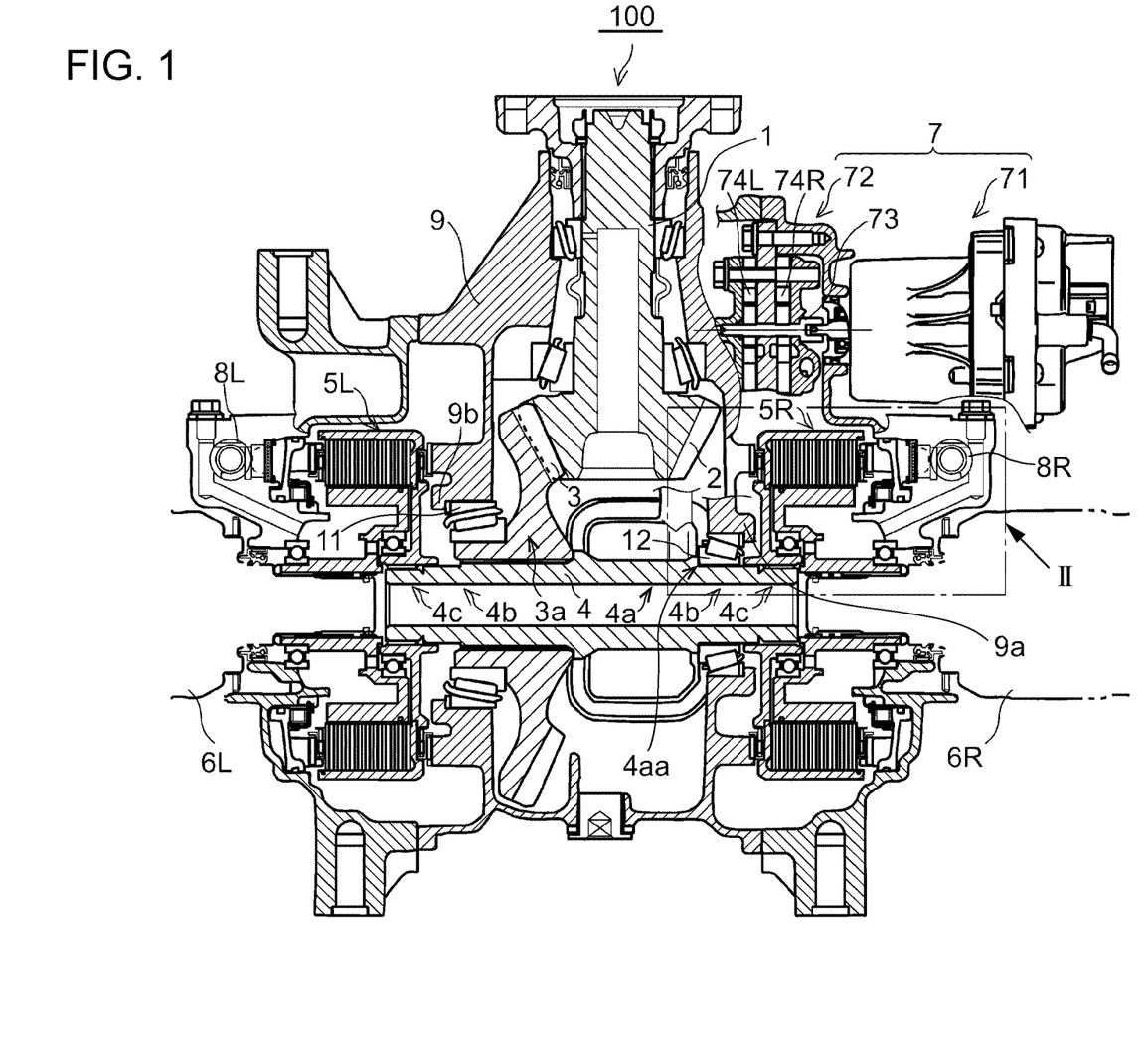
FIG. 1 is a sectional view of a main part of a power transmission device according to an embodiment.

An embodiment of the present disclosure will be described below in detail with reference to the drawings. FIG. 1 is a sectional view of a main part of a power transmission device 100 according to the embodiment of the present disclosure. A hydraulic power transmission device will be described as an example of the power transmission device 100 of the embodiment. The power transmission device 100 according to the embodiment is a differential mechanism for distributing revolution of a drive shaft 1 to left and right drive wheels (not shown).

The power transmission device 100 includes the drive shaft 1, which is connected to a propeller shaft (not shown). A driving force from a driving source (engine) (not shown) is transmitted to the drive shaft 1.

The power transmission device 100 includes a driving bevel gear 2 that rotates with the drive shaft 1, a driven bevel gear 3 that meshes with the driving bevel gear 2, and a center shaft 4 that is perpendicular to the drive shaft 1 and connected to the driven bevel gear 3 so as to be rotatable together. The power transmission device 100 also includes a left clutch 5L and a right clutch 5R that are disposed on a left end and a right end, respectively, of the center shaft 4, and includes a left output shaft 6L and a right output shaft 6R. The left output shaft 6L transmits a driving force transmitted by the left clutch 5L to the left drive wheel (not shown). The right output shaft 6R transmits a driving force transmitted by the right clutch 5R to the right drive wheel (not shown). The center shaft 4 is an input shaft for the left and right clutches 5L and 5R. The left and right output shafts 6L and 6R are output shafts for the left and right clutches 5L and 5R.

The power transmission device 100 also includes an electric oil pump 7, left and right pressure regulating valves 8L and 8R, and a differential case 9. The electric oil pump 7 supplies an oil (working fluid) to each of the left and right clutches 5L and 5R. The left and right pressure regulating valves 8L and 8R regulate (reduce) the pressure of the oil discharged from the electric oil pump 7 to the left clutch 5L and the oil discharged from the electric oil pump 7 to the right clutch 5R, respectively. The differential case 9 is a casing that covers the entire power transmission device 100, including the clutch 5.

The center shaft 4 includes a large-diameter portion 4a at an intermediate section thereof, medium-diameter portions 4b on the left side and the right side, respectively, of the large-diameter portion 4a, and small-diameter portions 4c adjacent, at left and right ends of the center shaft 4, respectively, to the medium-diameter portions 4b. The driven bevel gear 3 is fixed to the large-diameter portion 4a such that the center shaft 4 rotates, as one unit, with the driven bevel gear 3. Each of the small-diameter portions 4c at the left and right ends of the center shaft 4 includes a plurality of spline teeth formed in a circumferential direction and is splined to a power transmission element of the left or right clutches 5L or 5R corresponding thereto so as to be rotatable together.

The center shaft 4 is supported on the differential case 9 of the differential mechanism via tapered bearings 11 and 12. The tapered bearing 11 is secured in an axial direction thereof by being held between a stepped portion 9b of the differential case 9 and a stepped portion 3a formed at the driven bevel gear 3. The tapered bearing 12 is secured in an axial direction (longitudinal direction) thereof by being held between a stepped portion 9a of the differential case 9 and a stepped portion 4aa of the large-diameter portion 4a of the center shaft 4.

The electric oil pump 7 includes a motor 71 that generates a rotational force and a pump 72 that suctions the working fluid (oil) from an oil strainer and pressure-feeds the working fluid to the left and right clutches 5L and 5R by using the rotational force. The pump 72 has a tandem-pump structure that includes series-connected left and right internal gear pumps 74L and 74R disposed on a pump shaft 73. In the embodiment, the left internal gear pump 74L may pressure-feed the oil to the left clutch 5L and the right internal gear pump 74R may pressure-feed the oil to the right clutch 5R.

The left and right pressure regulating valves 8L and 8R are disposed directly adjacent to the left and right clutches 5L and 5R, respectively, in a substantially symmetrical manner. Each of the left and right pressure regulating valves 8L and 8R is a linear solenoid valve (electromagnetic pressure regulating valve).

Figure 2:
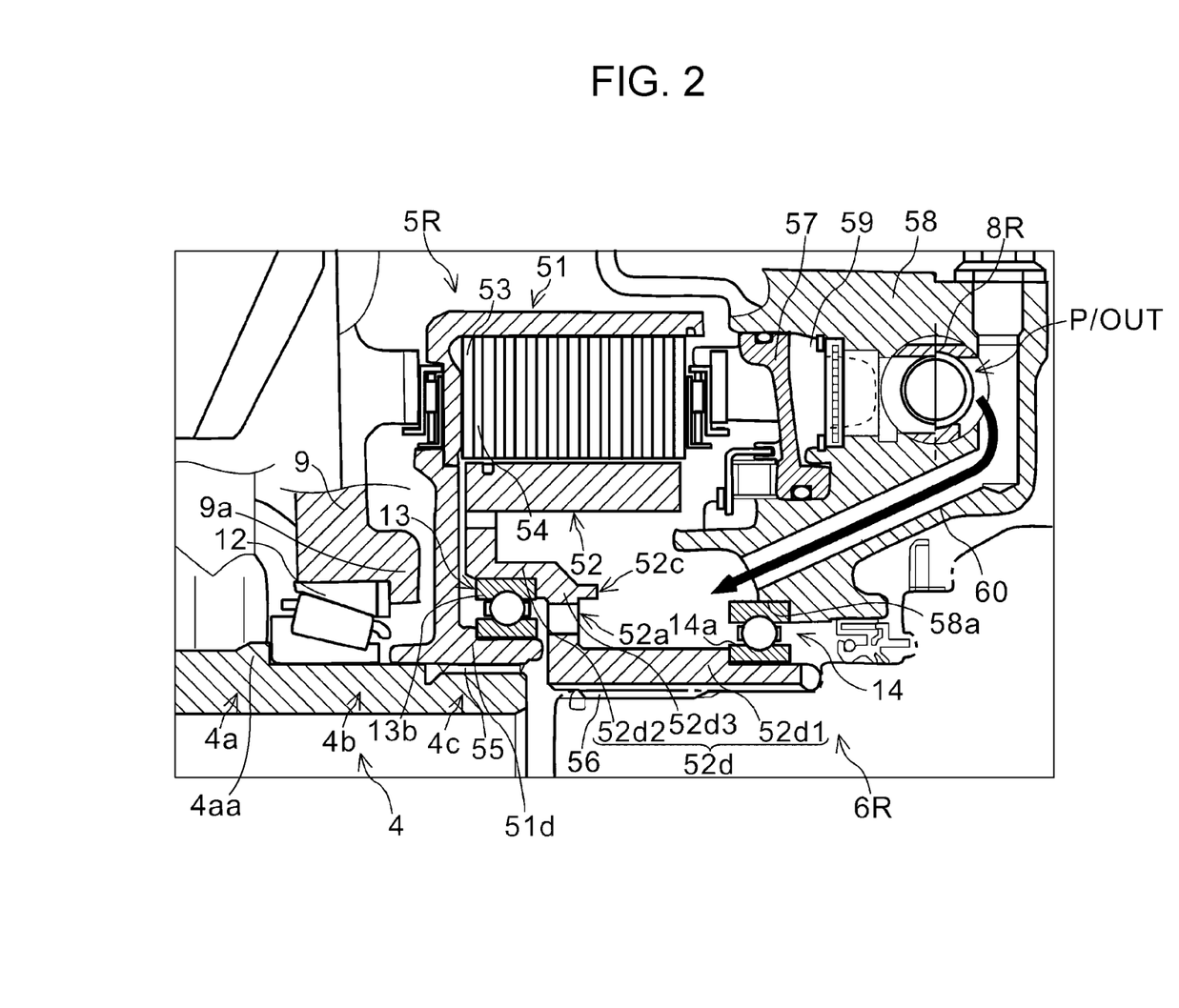
FIG. 2 is an enlarged view of region II in FIG. 1 and illustrates a peripheral area of ball bearings according to the embodiment.

FIG. 2 is an enlarged view of region II in FIG. 1 and illustrates a peripheral area of the ball bearings according to the embodiment. Each of the left and right clutches 5L and 5R is a multiplate wet clutch. Since the left and right clutches 5L and 5R have the same structures, only the right clutch 5R will be described. For the same reason, the indexes L and R, which denote "left" and "right", respectively, are omitted in the present description unless distinguishing sides is particularly necessary.

As illustrated in FIG. 2, the clutch 5R includes a clutch guide 51, which is an input-side rotary member that rotates with the center shaft 4, and a clutch hub 52, which is an output-side rotary member that rotates with the output shaft 6R. The clutch guide 51 has an inner surface to which a plurality of separator plates 53, as friction materials, are splined. The separator plates 53 are arranged in an axial direction at predetermined intervals. The clutch hub 52 has an outer surface to which a plurality of friction plates 54, as friction materials, are splined. The friction plates 54 are arranged in the axial direction at predetermined intervals. The separator plates 53 and the friction plates 54 are alternately arranged in the axial direction, which forms a stack of the separator plates 53 and the friction plates 54.

The clutch guide 51 includes a spline portion 55 at a base portion thereof. The spline portion 55 is splined to the small-diameter portion 4c at the right end of the center shaft 4. As a result, the clutch guide 51 rotates with the center shaft 4. The clutch hub 52 includes a spline portion 56 at a base part thereof. The spline portion 56 is splined to the right output shaft 6R. As a result, the clutch hub 52 rotates with the right output shaft 6R.

The clutch guide 51 and the clutch hub 52 are mutually supported via a ball bearing 13 and can rotate relatively to each other. The clutch hub 52 is fixed to a case 58 via a ball bearing 14 such that the clutch hub 52 is rotatable relative to the case 58.

The clutch guide 51 includes an inner cylinder portion 51d that extends in the axial direction. The clutch hub 52 includes an inner cylinder portion 52d that extends in the axial direction. The ball bearing 13 is in contact with an outer side of the inner cylinder portion 51d of the clutch guide 51 and with an inner side of the inner cylinder portion 52d of the clutch hub 52. The ball bearing 14 is in contact with an outer side of the inner cylinder portion 52d of the clutch hub 52 and with an inner side of a round hole 58a of the case 58 fixed to the inside of the differential case 9.

The round hole 58a of the case 58 is a hole through which the right output shaft 6R is inserted into the case 58. The right output shaft 6R is disposed by being inserted into the round hole 58a of the case 58. Thus, the round hole 58a of the case 58 and the clutch hub 52, which rotates with the right output shaft 6R, relatively rotate via the ball bearing 14.

In the embodiment, the case 58 in contact with the ball bearing 14 is a case for the pressure regulating valve 8R. However, the case in contact with the ball bearing 14 is not limited to such a case and may be another member, for example, another case as long as being a casing static relative to a rotational element or a stationary member in the clutch 5.

The inner cylinder portion 52d of the clutch hub 52 has a two-stage cylinder structure that includes a small-diameter inner cylinder portion 52d1 and a large-diameter inner cylinder portion 52d2, different in terms of diameter. The small-diameter inner cylinder portion 52d1 of the clutch hub 52 is supported by the ball bearing 14. The large-diameter inner cylinder portion 52d2 of the clutch hub 52 is supported by the ball bearing 13. The small-diameter inner cylinder portion 52d1 and the large-diameter inner cylinder portion 52d2 are connected to each other via an annular portion 52d3 that extends in a direction perpendicular to the rotation axis thereof.

Accordingly, the ball bearing 13 is in contact with an inner surface of the large-diameter inner cylinder portion 52d2 of the clutch hub 52 and with an outer surface of the inner cylinder portion 51d of the clutch guide 51. The ball bearing 14 is in contact with an outer surface of the small-diameter inner cylinder portion 52d1 of the clutch hub 52 and with the case 58.

The stack (hereinafter, referred to as "friction engagement part") of the separator plates 53 and the friction plates 54 is driven in an axial direction (left direction in FIG. 2) by a piston 57 during clutch engagement. The separator plates 53 and the friction plates 54 are friction-engaged to each other according to the driving of the piston 57, and the clutch is thereby engaged. The piston 57 is hydraulically driven in response to a hydraulic pressure in a piston chamber 59 and controlled such that a degree of clutch engagement required for the friction engagement part is obtained.

In the embodiment, a lubricating oil passage 60 that guides oil discharged through an outlet port P/OUT of the pressure regulating valve 8 directly into the clutch 5 is formed in the case 58.

The annular portion 52d3, opposite the ball bearing 13, of the clutch hub 52 includes a through hole 52a. The through hole 52a enables the oil introduced into the clutch 5 through the lubricating oil passage 60 to spread efficiently and uniformly over the ball bearings 13 and 14.

A projecting portion 52c projects, like an eave, from an outer-diameter side (outer edge side) of the through hole 52a so as to cover the through hole 52a. The projecting portion 52c enables a lubricating oil to be efficiently introduced into the through hole 52a even when the oil is subjected to a centrifugal force due to the rotation of the clutch hub 52.

Figure 3A:
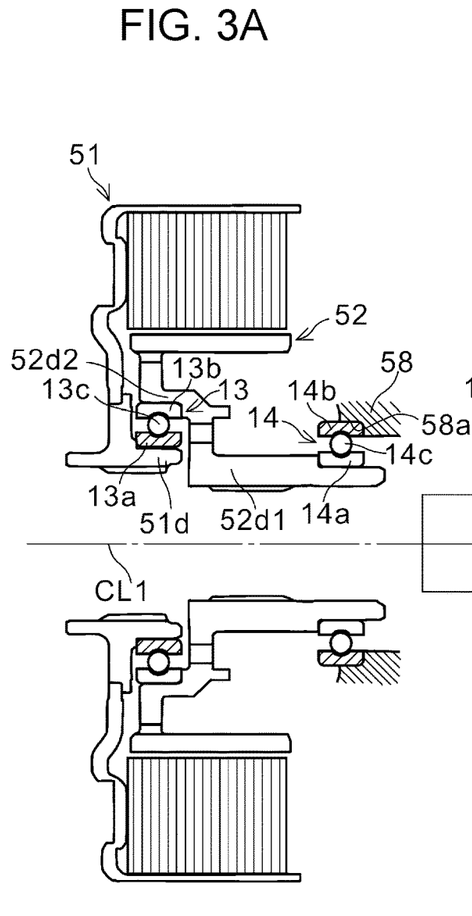
FIGS. 3A and 3B each illustrate a supporting structure supported by the ball bearings according to the embodiment and each illustrate the degree of inclination of a clutch hub.
Figure 3B:
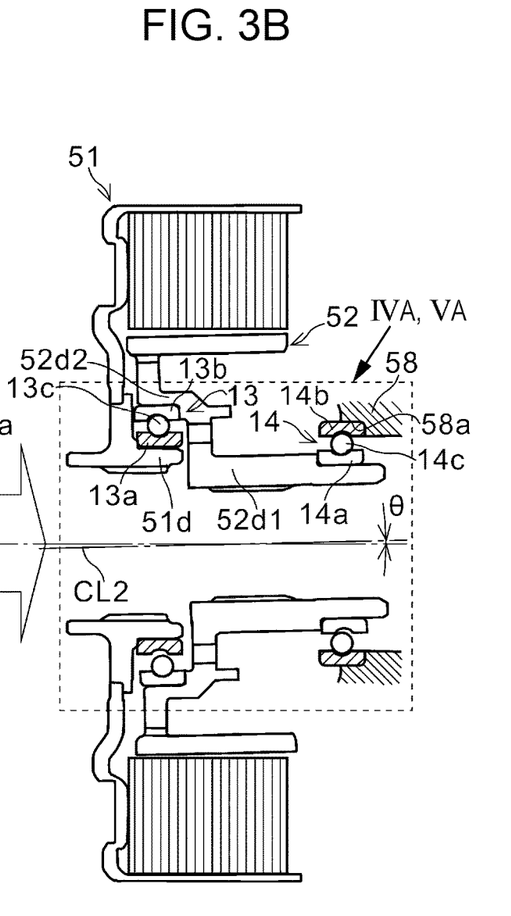

FIGS. 3A and 3B each illustrate a supporting structure supported by the ball bearings according to the embodiment and each illustrate the degree of inclination of the clutch hub 52. FIG. 3A illustrates a state in which the degree of inclination is zero. FIG. 3B illustrates a state in which the degree of inclination is θ. Here, the "degree of inclination" means an inclination angle of a center axis CL2 of the inner cylinder portion 52d of the clutch hub 52 relative to a center axis CL1 of the inner cylinder portion 51d of the clutch guide 51.

As illustrated in FIG. 3A, the ball bearings 13 and 14 according to the embodiment respectively include balls 13c and balls 14c. The balls 13c and the balls 14c are spherical rolling elements. The balls 13c are disposed between an inner ring 13a and an outer ring 13b to support the inner ring 13a and the outer ring 13b. The balls 14c are disposed between an inner ring 14a and an outer ring 14b to support the inner ring 14a and the outer ring 14b. The inner ring 13a of the ball bearing 13 is in close contact with the outer surface of the inner cylinder portion 51d of the clutch guide 51. The outer ring 13b of the ball bearing 13 is in loose contact with the inner surface of the large-diameter inner cylinder portion 52d2 of the clutch hub 52. The inner ring 14a of the ball bearing 14 is in loose contact with the outer surface of the small-diameter inner cylinder portion 52d1 of the clutch hub 52 and the outer ring 14b of the ball bearing 14 is in close contact with the case 58. Note that the closely-contacting inner ring 13a of the ball bearing 13 and the closely-contacting outer ring 14b of the ball bearing 14 are hatched in FIGS. 3A and 3B for convenience of description. The same hatching is applied to similarly closely-contacting inner and outer rings, to be described below, in FIGS. 4A and 4B and FIGS. 5A and 5B.

Figure 4A:
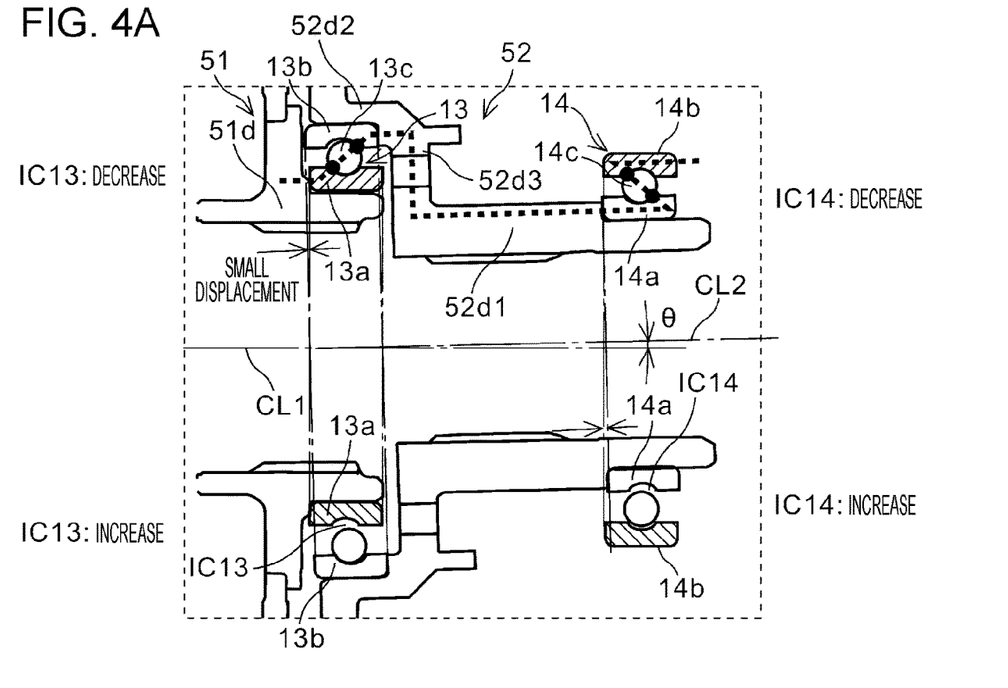
FIGS. 4A and 4B respectively illustrate a clutch-hub supporting structure (IVA/VA in FIG. 3B) according to the embodiment and a clutch-hub supporting structure according to existing technology for comparison.

The ball bearing 13 has an internal clearance IC13, in which the balls 13c can roll, between the inner ring 13a and the balls 13c or between the outer ring 13b and the balls 13c (refer to FIG. 4A). Similarly, the ball bearing 14 has an internal clearance IC14, in which the balls 14c can roll, between the inner ring 14a and the balls 14c or between the outer ring 14b and the balls 14c (refer to FIG. 4A). As illustrated in FIG. 3B, the clutch hub 52 thus inclines relative to the clutch guide 51 by the degree of inclination due to the presence of the internal clearances IC13 and IC14. In the supporting structure supported by the ball bearings 13 and 14 according to the embodiment, the degree of inclination of the clutch hub 52, due to the presence of the internal clearance IC13 and IC14, is θ.

Figure 4B:
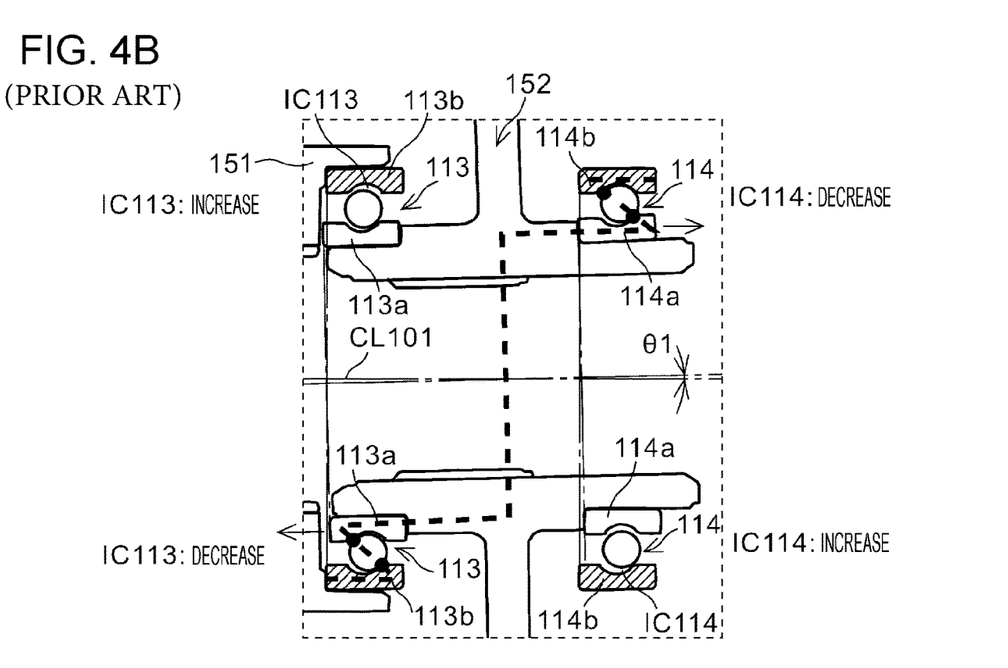

FIGS. 4A and 4B respectively illustrate a clutch-hub supporting structure according to the embodiment and a clutch-hub supporting structure according to existing technology for comparison. As illustrated in FIG. 4A, in the structure according to the embodiment, when the clutch hub 52 inclines in the counterclockwise direction relative to the clutch guide 51, the inclination of the clutch hub 52 is restricted by the inner ring 13a of the ball bearing 13 and the outer ring 14b of the ball bearing 14, which are positioned on an inclination direction side (a side above the center axis CL1 in FIG. 4A) of the center axis CL1. As a result, the clutch hub 52 is prevented from inclining relative to the clutch guide 51 by a degree exceeding the inclination degree θ, which is the degree of inclination due to the presence of the internal clearances IC13 and IC14.

In other words, in the supporting structure supported by the ball bearings 13 and 14 according to the present disclosure, when the clutch hub 52 inclines relative to the clutch guide 51, the internal clearance IC13 of the ball bearing 13 and the internal clearance IC14 of the ball bearing 14 on the inclination direction side of the center axis CL1 each decrease. As a result, the clutch hub 52 is prevented from inclining relative to the clutch guide 51 by a degree exceeding the inclination degree θ, which is the degree of inclination due to the presence of the internal clearances.

The thick dotted line in FIG. 4A indicates a direction of a load that the clutch hub 52, the ball bearing 13, and the ball bearing 14 receive in a state in which the inclination of the clutch hub 52 is restricted by the inner ring 13a of the ball bearing 13 and the outer ring 14b of the ball bearing 14.

A direction of a load applied by the ball bearing 13 to the clutch hub 52 is a direction that restricts inclination of the clutch hub 52 by a degree exceeding the inclination degree θ, which is the degree of inclination due to the presence of the internal clearances. Thus, the further the clutch hub 52 attempts to incline in the counterclockwise direction, the stronger the load applied by the ball bearing 13 onto the clutch hub 52, which prevents the clutch hub 52 from inclining by a degree exceeding the specific inclination degree θ.

In contrast, in the existing supporting structure, as illustrated in FIG. 4B, a ball bearing 113 is supported by an outer surface of an inner cylinder portion of a clutch hub 152 and an inner surface of an inner cylinder portion of a clutch guide 151, and a ball bearing 114 is supported by the outer surface of the inner cylinder portion of the clutch hub 152 and a case.

Therefore, inclination of the clutch hub 152 is restricted by an outer ring 113b of the ball bearing 113 on a side opposite to an inclination-direction side of a center axis CL101 and an outer ring 114b of the ball bearing 114 on the inclination-direction side of the center axis CL101.

Here, when the clutch hub 152 attempts to incline in the counterclockwise direction, an inner ring 113a of the ball bearing 113 and an inner ring 114a of the ball bearing 114 become displaced relative to the clutch hub 152. The displacement causes the clutch hub 152 to incline by a degree exceeding an inclination degree θ1 due to the presence of an internal clearance IC113 of the ball bearing 113 and an internal clearance IC114 of the ball bearing 114.

In contrast, in the supporting structure supported by the ball bearings 13 and 14 according to the embodiment, the clutch hub 52 is not allowed to incline relative to the clutch guide 51 by a degree exceeding the inclination degree θ, which is the degree of inclination due to the presence of the internal clearance IC13 of the ball bearing 13 and the internal clearance IC14 of the ball bearing 14.

Figure 5A:
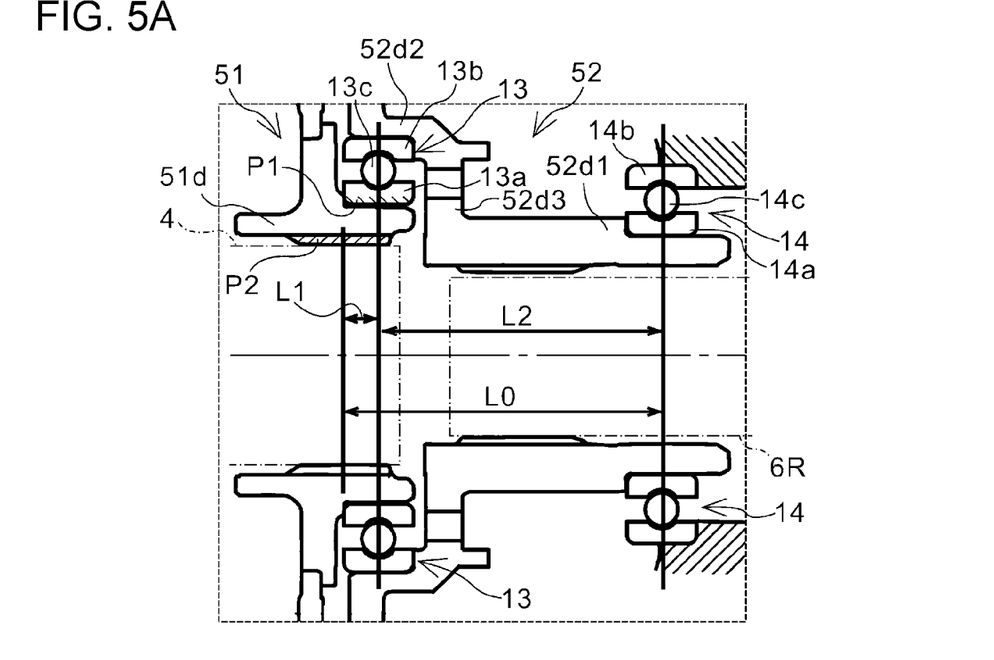
FIGS. 5A and 5B respectively illustrate the clutch-hub supporting structure (IVA/VA in FIG. 3B) according to the embodiment and the clutch-hub supporting structure according to existing technology for comparison.
Figure 5B:
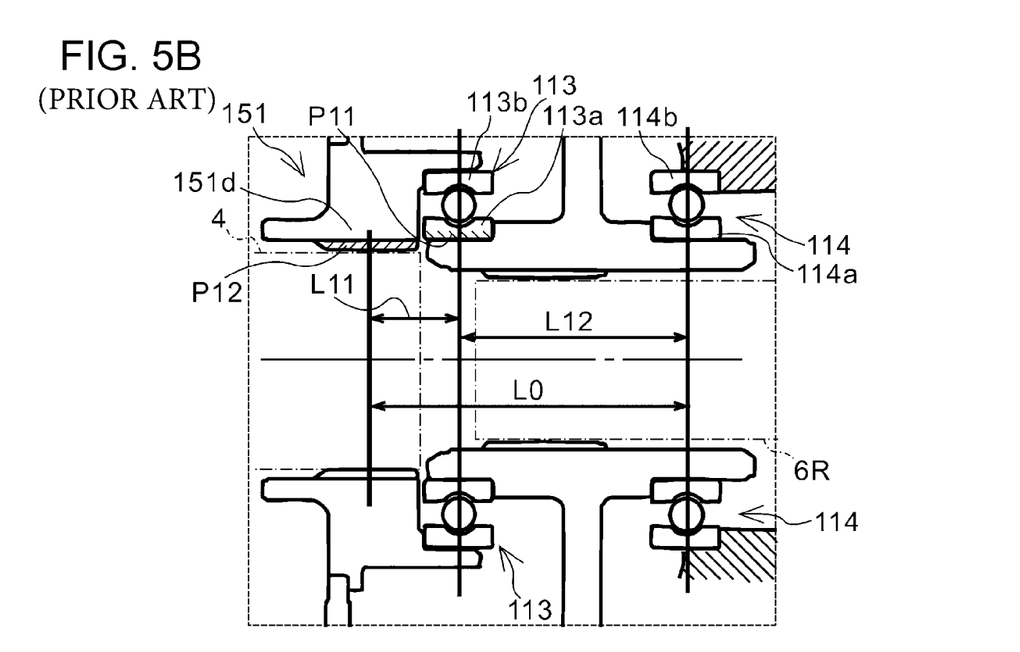

FIGS. 5A and 5B respectively illustrate the clutch-hub supporting structure according to the embodiment and the clutch-hub supporting structure according to existing technology, for comparison. In each of FIGS. 5A and 5B, a distance L0 is the distance between the ball bearing 14 and the center of a spline position where the center shaft 4 and the inner cylinder portion 51d of the clutch guide 51 are splined to each other.

As illustrated in FIG. 5A, in the structure according to the embodiment, a position P1 where the ball bearing 13 is disposed and a position P2 where the center shaft 4 and the inner cylinder portion 51d of the clutch guide 51 are splined to each other axially overlap each other.

As described above, in the embodiment, the position P1 of the ball bearing 13 is arranged so as to axially overlap the position P2 where the center shaft 4 and the inner cylinder portion 51d of the clutch guide 51 are splined to each other. Such an arrangement in which the position P1 and the position P2 axially overlap each other shortens the axial distance L1 between the center of the spline position and the ball bearing 13. Then, the axial distance L2 between the ball bearing 13 and the ball bearing 14 can be lengthened without the need of changing the distance L0.

In contrast, as illustrated in FIG. 5B, in the structure according to existing technology, a position P11 of the ball bearing 113 does not axially overlap a position P12 where the center shaft 4 and an inner cylinder portion 151d of the clutch guide 151 are splined to each other. Thus, in the structure in which the position P11 and the position P12 do not axially overlap each other, the axial distance L11 between the center of the spline position and the ball bearing 113 is necessarily long compared with the structure according to the embodiment. Then, the axial distance L12 between the ball bearing 113 and the ball bearing 114 is short compared with the structure according to the embodiment.

In the power transmission device according to the embodiment, as described above, the inner cylinder portion 52d of the clutch hub 52 is disposed on the outer side of the ball bearing 13 and on the inner side of the ball bearing 14. Then, the inner cylinder portion 52d of the clutch hub 52 is held, in a radial direction from the inner-diameter side and the outer-diameter side, by the two ball bearings 13 and 14. Here, the inner side of the ball bearing 13 is fixed to the inner cylinder portion 51d of the clutch guide 51, and the outer side of the ball bearing 14 is fixed to the case 58.

As a result, when the inner cylinder portion 52d of the clutch hub 52 inclines relative to the inner cylinder portion 51d of the clutch guide 51 and the case 58, the internal clearances of the ball bearings 13 and 14 in the inclination direction of the inner cylinder portion 52d each decrease. Then, a force suppressing the inclination of the inner cylinder portion 52d is applied in the inclination direction of the inner cylinder portion 52d in the ball bearing 13 and the ball bearing 14. Thus, inclination of the axis of the clutch hub 52 relative to the rotation shaft of the clutch guide 51 can be suppressed, and generation of a torque fluctuation and an abnormal noise due to the inclination of the axis can thereby be suppressed, compared with when the two bearings are disposed on the outer side of the inner cylinder portion 52d, as in the existing supporting structure.

In the embodiment, the inner cylinder portion 52d of the clutch hub 52 includes the small-diameter inner cylinder portion 52*d*1 and the large-diameter inner cylinder portion 52*d*2 that have hollow cylindrical shapes and diameters different from each other, the ball bearing 13 is disposed on the inner side of the large-diameter inner cylinder portion 52*d*2, and the ball bearing 14 is disposed on the outer side of the small-diameter inner cylinder portion 52*d*1. Providing the inner cylinder portion 52*d* of the clutch hub 52 with such different-diameter portions increases flexibility in arranging the ball bearings 13 and 14. Accordingly, it is possible to easily obtain the supporting structure in which the clutch hub 52 is supported by the two ball bearings 13 and 14 from the inner-diameter side and the outer-diameter side. Moreover, for example, the ball bearings 13 and 14 can have substantially identical diameters, as in the existing supporting structure. The supporting structure including such ball bearings can be easily applied to a power transmission device of the existing structure.

The embodiment is characterized by including the ball bearing 13 that supports a part of the clutch hub 52, the part being adjacent to the clutch guide 51 in the rotation-axis direction, and the ball bearing 14 that supports a part of the clutch hub 52, the part being away from the clutch guide 51 in the rotation-axis direction, and by disposing the ball bearing 13 on the inner side of the clutch hub 52 and the ball bearing 14 on the outer side of the clutch hub 52. Thus, the inner side and the outer side of the clutch hub 52 are respectively supported by the ball bearing 13 and the ball bearing 14, and as a result, the clutch hub 52 is held in the radial direction from the inner-diameter side and the outer-diameter side by the ball bearing 13 and the ball bearing 14. With such a structure, when the clutch hub 52 inclines relative to the clutch guide 51 because of the internal clearances of the bearings, the internal clearances of the bearings in the inclination direction of the clutch hub 52 each decrease. Then, the clutch hub 52 is subjected to a force suppressing the inclination. The force suppresses the inclination of the axis of the clutch hub 52 relative to the rotation shaft of the clutch guide 51 and thereby suppresses generation of a torque fluctuation and an abnormal noise due to the inclination of the axis of the clutch hub 52, compared with when the two bearings are disposed on the outer side of the clutch hub 52, as in the existing supporting structure.

In the power transmission device, the clutch guide 51 is disposed on the inner side of the ball bearing 13, and the case 58 is disposed on the outer side of the ball bearing 14. Such a structure can suppress the inclination of the axis of the clutch hub 52 relative to the clutch guide 51 or the case 58.

Each of the ball bearing 13 and the ball bearing 14 of the power transmission device is a ball bearing, which has a structure in which an outer ring and an inner ring are supported via spherical balls. The structure can effectively support a load even when the outer ring and the inner ring become relatively displaced in an axial direction, compared with when the outer ring and the inner ring are supported by non-spherical elements, such as cylindrical elements. The ball bearing is thus suitable as a bearing for a power transmission element.

In the power transmission device, arranging the position of the ball bearing 13 so as to axially overlap the position where the first rotation shaft and the first engaging element are splined to each other can shorten the axial distance L1 between the spline position and the ball bearing 13.

Then, it is possible to lengthen the axial distance L2 between the ball bearing 13 and the ball bearing 14 without changing the axial distance L0 between the center of the spline position and the ball bearing 14. Thus, the axial length of the inner cylinder portion 52*d*, which is supported by the ball bearings 13 and 14, of the clutch hub 52 can be lengthened without the need of lengthening the distance L0 between the center of the spline position and the ball bearing 14, and support stiffness of the clutch hub 52 can thereby be increased.

The embodiment of the present disclosure has been described above. The present disclosure is however not limited to the above-described embodiment and can be variously modified within the scope of the claims and the scope of the technical concepts disclosed in the description and the drawings.

Figure 6:
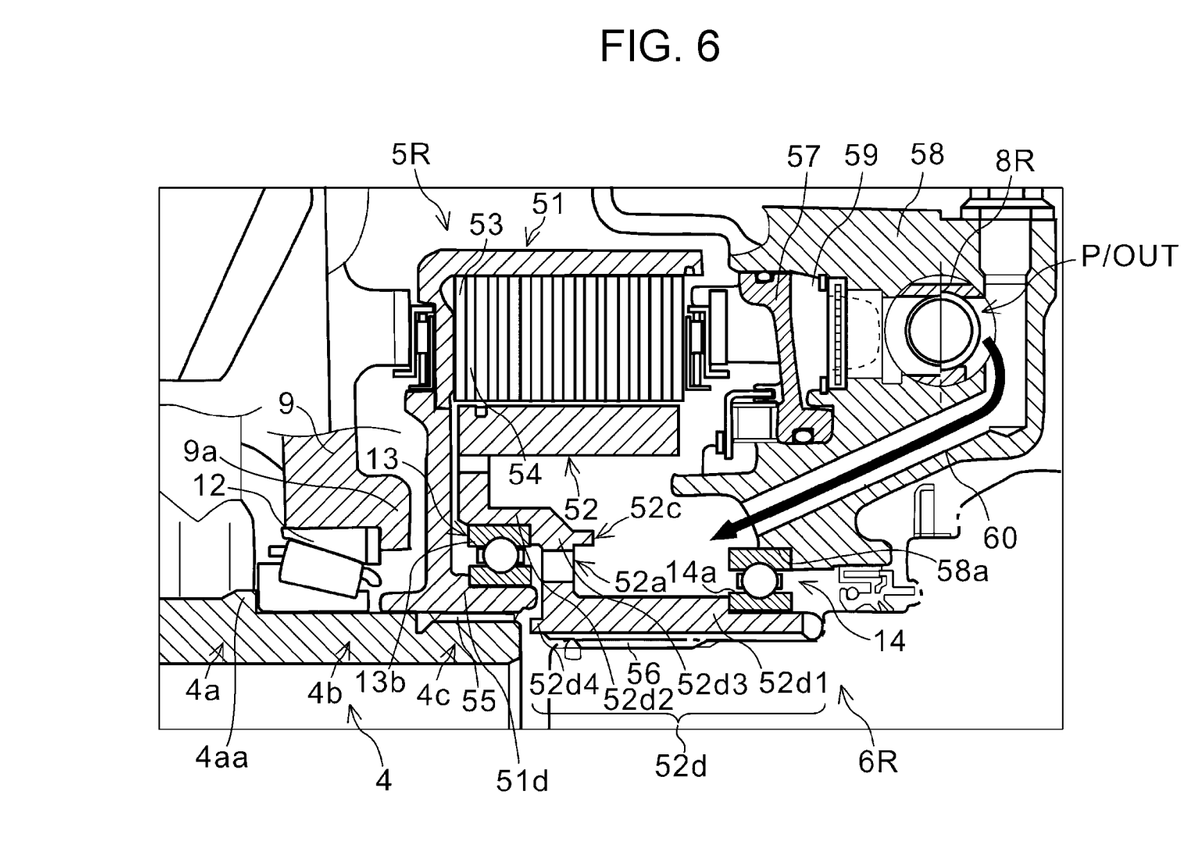
FIG. 6 illustrates a peripheral area of the ball bearings according to a first modification of the embodiment.

FIG. 6 is a view of a peripheral area of the ball bearings 13 and 14 in a first modification according to the embodiment. In the first modification, the clutch hub 52 includes an axially-projecting portion 52*d*4 that projects in the axial direction of the clutch hub 52. The axially-projecting portion 52*d*4 has a shape that extends to a position on the inner-diameter side of the inner cylinder portion 51*d* of the clutch guide 51. The shape enables efficient guiding of a hydraulic-control working fluid that has passed through the through hole 52*a*, for example, to the ball bearing 13.

In the above description of the embodiment, a deep-groove ball bearing has been described as an example of the ball bearings 13 and 14; however, the type of the ball bearings 13 and 14 is not limited to the deep-groove type. In other words, the present disclosure is applicable not only to deep-groove ball bearings but also to other ball bearings such as angular contact ball bearings. Moreover, the present disclosure is also applicable to double-row bearings as well as single-row bearings.

Figure 7:
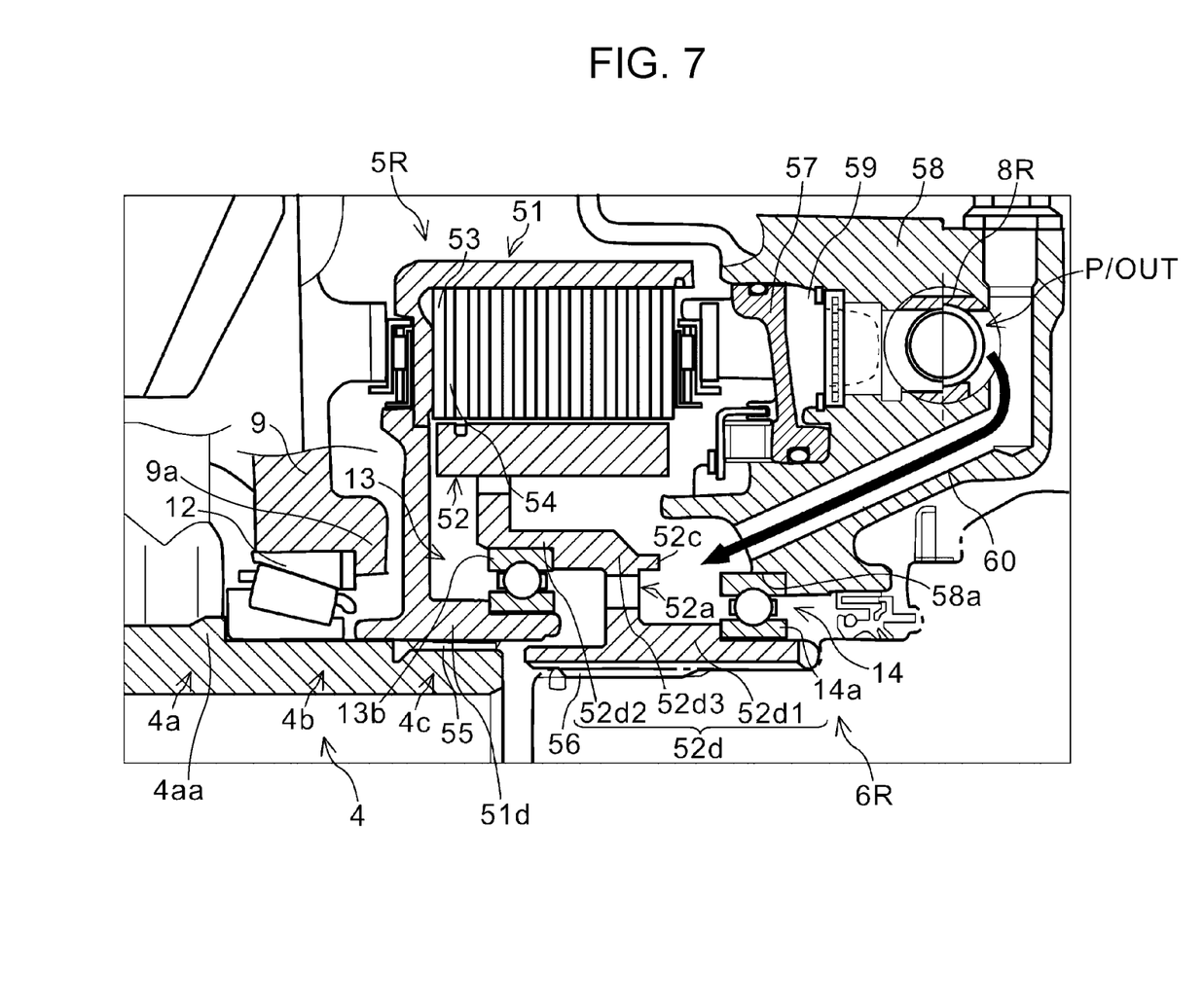
FIG. 7 illustrates a peripheral area of the ball bearings according to a second modification of the embodiment.

An example of the structure according to the embodiment, in which the axial distance L1 between the spline position and the ball bearing 13 is short, has been described above; however, the structure is not limited thereto. FIG. 7 illustrates a peripheral area of the ball bearings 13 and 14 according to a second modification of the embodiment. In the second modification, the inner cylinder portion 52*d* of the clutch hub 52 is not so long as in the above-described embodiment, but similarly to the above-described embodiment, is disposed on an outer side of the ball bearing 13 and on an inner side of the ball bearing 14. Thus, similarly to the above-described embodiment, inclination of the inner cylinder portion 52*d* of the clutch hub 52 can be suppressed.

A power transmission device according to an aspect of the present disclosure includes a first rotation shaft (for example, a center shaft 4 in an embodiment); a second rotation shaft (for example, an output shaft 6 in the embodiment) that shares a common rotation axis with the first rotation shaft; a power transmission element (for example, a clutch 5 in the embodiment) including a first engaging element (for example, a clutch guide 51 in the embodiment) that rotates with the first rotation shaft and a second engaging element (for example, a clutch hub 52 in the embodiment) that rotates with the second rotation shaft, the power transmission element being capable of transmitting power from the first engaging element to the second engaging element; a casing (for example, a differential case 9 in the embodiment) that accommodates the power transmission element; a first bearing (for example, a ball bearing 13 in the embodiment) interposed between the first engaging element and the second engaging element; and a second bearing (for example, a ball bearing 14 in the embodiment) interposed between the second engaging element and the casing. The first engaging element includes a first extending portion (for example, an inner cylinder portion 51*d* in the embodiment) that extends in a direction of the rotation axis. The second engaging element includes a second extending portion (for example, an inner cylinder portion 52*d* in the embodiment) that extends in the direction of the rotation axis. The casing includes a third extending portion (for example, a round hole 58*a* in the embodiment) that extends in the direction of the rotation axis. The first bearing is disposed on an outer side of the first extending portion and on an inner side of the second extending portion. The second bearing is disposed on an outer side of the second extending portion and on an inner side of the third extending portion.

The second extending portion of the second engaging element, which is thus disposed on an outer side of the first bearing and on an inner side of the second bearing, is held from an inner-diameter side and an outer-diameter side, in a radial direction, by the first bearing and the second bearing. Here, an inner side of the first bearing is fixed to the first extending portion of the first engaging element, and an outer side of the second bearing is fixed to the third extending portion. Thus, when the second extending portion inclines relative to the first extending portion and the third extending portion because of internal clearances of the bearings, the internal clearances of the bearings in an inclination direction of the second extending portion decrease. The second extending portion thereby receives a force suppressing the inclination. Such a structure can suppress inclination of the axis of the second engaging element relative to the rotation shaft of the first engaging element to thereby suppress generation of a torque fluctuation and an abnormal noise due to the inclination of the axis of the second engaging element, compared with when the two bearings are disposed on the outer side of the second extending portion, as in an existing structure.

In the power transmission device, the second extending portion may include a small-diameter portion (for example, a small-diameter inner cylinder portion 52*d*1 in the embodiment) and a large-diameter portion (for example, a large-diameter inner cylinder portion 52*d*2 in the embodiment) that have hollow cylindrical shapes and diameters different from each other, the first bearing may be disposed on an inner side of the large-diameter portion, and the second bearing may be disposed on an outer side of the small-diameter portion. Providing the second extending portion with such different-diameter portions can increase flexibility in arranging the first bearing and the second bearing, which enables easy achievement of a supporting structure in which the second extending portion is supported by the two bearings from the inner-diameter side and the outer-diameter side. The first bearing and the second bearing may have, for example, substantially identical diameters, as in the existing structure. The supporting structure including such bearings can be easily applied to a power transmission device of the existing structure.

The power transmission device may include a connection portion (for example, an annular portion 52*d*3 in the embodiment) that extends in a direction perpendicular to the rotation axis and connects the small-diameter portion and the large-diameter portion to each other. The connection portion may include a through hole (52*a*). The second extending portion may include a projecting portion (52*d*4) that projects, in an axial direction of the second engaging element, from the connection portion to a position on an inner-diameter side of the first extending portion. The presence of the projecting portion enables, for example, efficient guiding, to the first bearing, of a hydraulic-control working fluid that has passed through the through hole.

A power transmission device according to another aspect of the present disclosure includes the first rotation shaft; the second rotation shaft that shares a common rotation axis with the first rotation shaft; the power transmission element including the first engaging element that rotates with the first rotation shaft and the second engaging element that rotates with the second rotation shaft, the power transmission element being capable of transmitting power from the first engaging element to the second engaging element; the first bearing that supports a part of the second engaging element, the part being adjacent to the first engaging element in a rotation-axis direction; and the second bearing that supports a part of the second engaging element, the part being away from the first engaging element in the rotation-axis direction. The first bearing is disposed on an inner side of the second engaging element. The second bearing is disposed on an outer side of the second engaging element.

As described above, the inner side of the second engaging element is supported by the first bearing, the outer side of the second engaging element is supported by the second bearing, and the second engaging element is thus held, in the radial direction from the inner-diameter side and the outer-diameter side, by the first bearing and the second bearing. As a result, when the second engaging element inclines relative to the first engaging element because of the internal clearances of the bearings, the internal clearances of the bearings in an inclination direction of the second engaging element decrease. The second engaging element thereby receives a force suppressing the inclination. Such a structure can suppress inclination of the axis of the second engaging element relative to the rotation shaft of the first engaging element to thereby suppress generation of a torque fluctuation and an abnormal noise due to the inclination of the axis of the second engaging element, compared with when the two bearings are disposed on the outer side of the second engaging element, as in the existing structure.

The first engaging element of the power transmission device may be disposed on the inner side of the first bearing. In addition, the power transmission device may include a stationary member (for example, a case 58 in the embodiment) disposed on the outer side of the second bearing. In such a structure, it is possible to suppress the inclination of the axis of the second engaging element relative to the first engaging element or to the stationary member.

Each of the first bearing and the second bearing of the power transmission device may be a ball bearing. The ball bearing has a structure in which an outer ring and an inner ring are supported by spherical balls. The structure can effectively support a load even when the outer ring and the inner ring become relatively displaced in an axial direction, compared with when the outer ring and the inner ring are supported by non-spherical elements, such as cylindrical elements. The ball bearing is thus suitable as a bearing for a power transmission element.

In the power transmission device, the second rotation shaft may include a pair of rotation shafts (6L) and (6R) that extend in a width direction of a vehicle and transmit power to left and right drive wheels, respectively, of the vehicle, and the power transmission element may include a pair of clutches (5L) and (5R) disposed between the first rotation shaft and the pair of rotation shafts (6L) and (6R), respectively.

In the power transmission device, an axial position where the first bearing is disposed may overlap an axial position where the first rotation shaft and the first engaging element are splined to each other. Arranging the position of the first bearing so as to axially overlap the position where the first rotation shaft and the first engaging element are splined to each other, as described above, can shorten the axial distance between the spline position and the first bearing. Then, it is possible to lengthen the axial distance between the first bearing and the second bearing without changing the axial distance between the spline position and the second bearing. Thus, the axial length of the second extending portion, which is supported by the first and second bearings, of the second engaging element can be lengthened without the need of lengthening the distance between the spline position and the second bearing, and support stiffness of the second engaging element can thereby be increased.

Note that the aforementioned reference characters and names in parentheses are the reference characters and the names, which are indicated as examples of the present disclosure, of corresponding components of the embodiment. The embodiment will be described later.

The power transmission device according to the present disclosure can suppress the inclination of the power transmission element relative to the rotation shaft, thereby suppressing generation of a torque fluctuation and an abnormal noise due to the inclination.

Obviously, numerous modifications and variations of the present invention are possible in light of the above teachings. It is therefore to be understood that within the scope of the appended claims, the invention may be practiced otherwise than as specifically described herein.

What is claimed is:

1. A power transmission device comprising:
a first rotation shaft;
a second rotation shaft that shares a common rotation axis with the first rotation shaft;
a power transmission element including
a first engaging element that rotates with the first rotation shaft, and
a second engaging element that rotates with the second rotation shaft,
the power transmission element being capable of transmitting power from the first engaging element to the second engaging element;
a casing that accommodates the power transmission element;
a first bearing interposed between the first engaging element and the second engaging element; and
a second bearing interposed between the second engaging element and the casing,
wherein the first engaging element includes a first extending portion that extends in a direction of the rotation axis,
wherein the second engaging element includes a second extending portion that extends in the direction of the rotation axis,
wherein the casing includes a third extending portion that extends in the direction of the rotation axis,
wherein the first bearing is disposed on an outer side of the first extending portion and on an inner side of the second extending portion, and
wherein the second bearing is disposed on an outer side of the second extending portion and on an inner side of the third extending portion.

2. The power transmission device according to claim 1, wherein the second extending portion includes a small-diameter portion and a large-diameter portion that have hollow cylindrical shapes and diameters different from each other,
wherein the first bearing is disposed on an inner side of the large-diameter portion, and
wherein the second bearing is disposed on an outer side of the small-diameter portion.

3. The power transmission device according to claim 2, further comprising:
a connection portion that extends in a direction perpendicular to the rotation axis and connects the small-diameter portion and the large-diameter portion to each other,
wherein the connection portion has a through hole, and
wherein the second extending portion includes a projecting portion that projects in an axial direction of the second engaging element from the connection portion to a position on an inner-diameter side of the first extending portion.

4. A power transmission device comprising:
a first rotation shaft;
a second rotation shaft that shares a common rotation axis with the first rotation shaft;
a power transmission element including
a first engaging element that rotates with the first rotation shaft, and
a second engaging element that rotates with the second rotation shaft,
the power transmission element being capable of transmitting power from the first engaging element to the second engaging element;
a first bearing that supports a part of the second engaging element, the part being adjacent to the first engaging element in the direction of the rotation axis; and
a second bearing that supports a part of the second engaging element, the part being away from the first engaging element in the direction of the rotation axis,
wherein the first bearing is disposed on an inner side of the second engaging element, and
wherein the second bearing is disposed on an outer side of the second engaging element.

5. The power transmission device according to claim 4, wherein the first engaging element is disposed on an inner side of the first bearing.

6. The power transmission device according to claim 4, further comprising:
a stationary member disposed on an outer side of the second bearing.

7. The power transmission device according to claim 1, wherein the first bearing and the second bearing are ball bearings.

8. The power transmission device according to claim 4, wherein the first bearing and the second bearing are ball bearings.

9. The power transmission device according to claim 1, wherein the second rotation shaft includes a pair of rotation shafts that extend in a width direction of a vehicle and transmit power to left and right drive wheels, respectively, of the vehicle, and
wherein the power transmission element includes a pair of clutches disposed between the first rotation shaft and the pair of rotation shafts, respectively.

10. The power transmission device according to claim 4, wherein the second rotation shaft includes a pair of rotation shafts that extend in a width direction of a vehicle and transmit power to left and right drive wheels, respectively, of the vehicle, and
wherein the power transmission element includes a pair of clutches disposed between the first rotation shaft and the pair of rotation shafts, respectively.

11. The power transmission device according to claim 1, wherein an axial position where the first bearing is disposed overlaps an axial position where the first rotation shaft and the first engaging element are splined to each other.

12. The power transmission device according to claim 4, wherein an axial position where the first bearing is disposed overlaps an axial position where the first rotation shaft and the first engaging element are splined to each other.

13. A power transmission device, comprising:
a first rotation shaft rotatable about a rotation axis extending in an axis direction;
a second rotation shaft rotatable about the rotation axis;
a first engaging element rotatable with the first rotation shaft about the rotation axis, the first engaging element including a first extending portion extending in the axis direction;
a second engaging element rotatable with the second rotation shaft about the rotation axis, the second engaging element including a second extending portion extending in the axis direction;
a power transmission provided between the first engaging element and the second engaging element to transmit power from the first engaging element to the second engaging element;
a casing accommodating the power transmission and including a third extending portion extending in the axis direction;
a first bearing provided between the first engaging element and the second engaging element in a radial direction with respect to the rotation axis, the first engaging element being provided between the rotation axis and the first bearing in the radial direction; and
a second bearing provided between the second engaging element and the casing in the radial direction, the second engaging element being provided between the rotation axis and the second bearing in the radial direction.

14. The power transmission device according to claim 13, wherein the second extending portion includes a small-diameter portion and a large-diameter portion that have hollow cylindrical shapes and diameters different from each other,
wherein the first bearing is provided between the large-diameter portion and the first extending portion in the radial direction, and
wherein the second bearing is provided between the small-diameter portion and the third extending portion in the radial direction.

15. The power transmission device according to claim 14, further comprising:
a connection portion that extends in the radial direction and connects the small-diameter portion and the large-diameter portion to each other,
wherein the connection portion has a through hole, and
wherein the second extending portion includes a projecting portion that projects in the axial direction from the connection portion to a position between the first extending portion and the rotation axis in the radial direction.

16. A power transmission device, comprising:
a first rotation shaft rotatable about a rotation axis extending in an axis direction;
a second rotation shaft rotatable about the rotation axis;
a first engaging element rotatable with the first rotation shaft about the rotation axis;
a second engaging element rotatable with the second rotation shaft about the rotation axis;
a power transmission provided between the first engaging element and the second engaging element to transmit power from the first engaging element to the second engaging element;
a first bearing provided between the rotation axis and the second engaging element in a radial direction with respect to the rotation axis and supporting a first part of the second engaging element; and
a second bearing provided such that the second engaging element is between the second bearing and the rotation axis in the radial direction and supporting a second part of the second engaging element, the second part being farther from the first engaging element in the axis direction than the first part.

17. The power transmission device according to claim 16, wherein the first engaging element is provided between the first bearing and the rotation axis.

18. The power transmission device according to claim 16, further comprising:
a stationary member provided such that the second bearing is between the stationary member and the rotation axis in the radial direction.

19. The power transmission device according to claim 13, wherein the first bearing and the second bearing comprise ball bearings.

20. The power transmission device according to claim 16, wherein the first bearing and the second bearing comprise ball bearings.

21. The power transmission device according to claim 13, wherein the second rotation shaft includes rotation shafts that extend in a width direction of a vehicle and transmit power to left and right drive wheels of the vehicle, respectively, and
wherein the power transmission includes clutches disposed between the first rotation shaft and the rotation shafts, respectively.

22. The power transmission device according to claim 16, wherein the second rotation shaft includes rotation shafts that extend in a width direction of a vehicle and transmit power to left and right drive wheels of the vehicle, respectively, and
wherein the power transmission includes clutches disposed between the first rotation shaft and the rotation shafts, respectively.

23. The power transmission device according to claim 13, wherein a position of the first bearing in the axis direction overlaps a position in the axis direction where the first rotation shaft and the first engaging element are splined to each other.

24. The power transmission device according to claim 16, wherein a position of the first bearing in the axis direction overlaps a position in the axis direction where the first rotation shaft and the first engaging element are splined to each other.

* * * * *